United States Patent
An et al.

(10) Patent No.: US 10,067,276 B2
(45) Date of Patent: Sep. 4, 2018

(54) POLARIZER, METHOD OF MANUFACTURING THE SAME, AND DISPLAY DEVICE INCLUDING THE SAME

(71) Applicant: Samsung Display Co., Ltd, Yongin-si, Gyeonggi-do (KR)

(72) Inventors: Moon Jung An, Hwaseong-si (KR); Jung Gun Nam, Suwon-si (KR); Su Kyoung Yang, Yongin-si (KR); Gyung Min Baek, Yongin-si (KR); Kang Soo Han, Seoul (KR); Joon Yong Park, Gunpo-si (KR); Sang Won Shin, Yongin-si (KR); Hyun Eok Shin, Gwacheon-si (KR)

(73) Assignee: Samsung Display Co., Ltd. (KR)

( * ) Notice: Subject to any disclaimer, the term of this patent is extended or adjusted under 35 U.S.C. 154(b) by 0 days.

(21) Appl. No.: 15/477,719

(22) Filed: Apr. 3, 2017

(65) Prior Publication Data
US 2018/0059301 A1    Mar. 1, 2018

(30) Foreign Application Priority Data
Aug. 25, 2016  (KR) .......................... 10-2016-0108551

(51) Int. Cl.
| | | |
|---|---|---|
| G02F 1/1333 | (2006.01) | |
| G02B 5/30 | (2006.01) | |
| G02F 1/1335 | (2006.01) | |
| G02F 1/1368 | (2006.01) | |

(52) U.S. Cl.
CPC ......... *G02B 5/3058* (2013.01); *G02F 1/1368* (2013.01); *G02F 1/133345* (2013.01); *G02F 1/133512* (2013.01); *G02F 1/133528* (2013.01); *G02F 2001/133548* (2013.01); *G02F 2201/123* (2013.01); *G02F 2201/50* (2013.01)

(58) Field of Classification Search
CPC .............. G02F 1/134363; G02F 2001/133548
See application file for complete search history.

(56) References Cited

U.S. PATENT DOCUMENTS

| | | |
|---|---|---|
| 6,288,840 B1 | 9/2001 | Perkins et al. |
| 7,656,119 B2 | 2/2010 | Kim |
| 8,488,087 B2 | 7/2013 | Mori et al. |
| 8,988,637 B2 | 3/2015 | Mori et al. |
| 9,001,290 B2 | 4/2015 | Lee et al. |
| 9,212,418 B2 | 12/2015 | Ehira et al. |

(Continued)

FOREIGN PATENT DOCUMENTS

| | | |
|---|---|---|
| JP | 2007-010712 | 1/2007 |
| JP | 2008-127624 | 6/2008 |

(Continued)

OTHER PUBLICATIONS

European Search Report, Application No. 17186435.8, dated Jan. 17, 2018, pp. 1-6.

*Primary Examiner* — Phu Vu
(74) *Attorney, Agent, or Firm* — Innovation Counsel LLP

(57) ABSTRACT

Provided is a polarizer. The polarizer includes a base layer and a wire grid layer which is disposed on the base layer and which include a plurality of wire metal patterns extending along a first direction and spaced apart from each other along a second direction crossing the first direction, wherein the wire grid layer is made of an aluminum (Al) alloy containing nickel (Ni) and lanthanum (La).

19 Claims, 19 Drawing Sheets

(56) References Cited

U.S. PATENT DOCUMENTS

2010/0231116 A1* 9/2010 Ochi .................... G02B 5/0833
313/352
2016/0026034 A1* 1/2016 Nam ...................... G02B 5/208
349/43
2016/0299273 A1* 10/2016 Oh ....................... G02B 5/3058

FOREIGN PATENT DOCUMENTS

| JP | 2014-123139 | 7/2014 |
|----|----|----|
| KR | 10-2006-0021067 A | 3/2006 |
| KR | 10-0932933 A | 12/2009 |
| KR | 10-2014-0007648 A | 1/2014 |
| KR | 10-2015-0033561 A | 4/2015 |
| WO | 2008084856 A1 | 7/2008 |

* cited by examiner (a)

(b)

(c)

(a)

(b)

(c)

POLARIZER, METHOD OF MANUFACTURING THE SAME, AND DISPLAY DEVICE INCLUDING THE SAME

This application claims priority from Korean Patent Application No. 10-2016-01018551 filed on Aug. 25, 2016 in the Korean Intellectual Property Office, the disclosure of which is incorporated herein by reference in its entirety.

BACKGROUND

1. Field of the Invention

The present inventive concept relates to a polarizer, a method of manufacturing the same, and a display device including the same.

2. Description of the Related Art

Display devices, such as liquid crystal displays, are made in the form of a motherboard in the manufacturing process. The motherboard includes a plurality of cells, and the plurality of cells included in the motherboard is cut, so as to make one liquid crystal display device. In this case, a large number of polarizers controlling the polarization of light are used in the liquid crystal display device. The polarizer serves to convert light of a natural state into polarized light of a single straight state.

In order to make the polarized light in the liquid crystal display, a film-type polarizer has been generally used. However, recently, a wire grid polarizer including a nano-sized metal wire pattern has been used as an alternative thereof.

The wire grid polarizer may be manufactured by depositing a metal on a substrate to form a metal layer, forming a mask on the metal layer and then patterning the metal layer using the mask. In this case, aluminum having easy processability and excellent reflectance may be generally used.

SUMMARY

However, in the process of manufacturing the wire grid polarizer, illustratively, in the process of forming the mask, the metal layer made of aluminum may be exposed to high temperature environment, and thus hillocks, which are semispherical protrusions, may occur in the metal layer.

For this reason, there are problems in that the metal wire pattern of the wire grid polarizer is not uniformly formed, the reliability of the wire grid polarizer is deteriorated.

Accordingly, aspects of the present inventive concept provide a polarizer having improved reliability and a display device including the same.

However, aspects of the present inventive concept are not restricted to the one set forth herein. The above and other aspects of the present inventive concept will become more apparent to one of ordinary skill in the art to which the present inventive concept pertains by referencing the detailed description of the present inventive concept given below.

According to an aspect of the present inventive concept, there is provided a polarizer. The polarizer includes a base layer and a wire grid layer which is disposed on the base layer and which include a plurality of wire metal patterns extending along a first direction, the plurality of wire metal patterns spaced apart from each other along a second direction crossing the first direction, wherein the wire grid layer is made of an aluminum (Al) alloy containing nickel (Ni) and lanthanum (La).

The content of nickel (Ni) in the aluminum (Al) alloy may be 0.01 at % to 0.08 at %, and the content of lanthanum (La) in the aluminum (Al) alloy may be 0.01 at % to 0.08 at %.

The total content of nickel (Ni) and lanthanum (La) in the aluminum (Al) alloy is 0.1 at % or less.

The content of nickel (Ni) in the aluminum (Al) alloy may be 0.02 at %, and the content of lanthanum (La) in the aluminum (Al) alloy may be 0.04 at %.

The refractive index of the aluminum (Al) alloy may be 0.9 to 1.1, and the extinction coefficient of the aluminum (Al) alloy may be 6.4 or more.

The wire grid layer may further include an oxide film formed on a surface of each of the plurality of wire metal patterns, and the oxide film may be made of an oxide of the aluminum (Al) alloy.

The wire grid layer may further include a hard mask pattern disposed on each of the plurality of wire metal patterns.

The hard mask pattern may contain silicon oxide or silicon nitride.

The wire grid layer further may include an oxide film formed on a lateral side of each of the plurality of wire metal patterns, and the oxide film may be made of an oxide of the aluminum (Al) alloy.

According to an aspect of the present inventive concept, there is provided a method of manufacturing a polarizer. The method includes forming a metal layer on a base layer; forming a hard mask layer on the metal layer using chemical vapor deposition; forming a resist layer on the hard mask layer; pressing the resist layer using a mold to form a resist pattern; etching the hard mask layer using the resist pattern as a mask; and etching the metal layer using the etched hard mask layer as a mask, wherein the metal layer is made of an aluminum (Al) alloy containing nickel (Ni) and lanthanum (La).

The content of nickel (Ni) in the aluminum (Al) alloy may be 0.01 at % to 0.08 at %, and the content of lanthanum (La) in the aluminum (Al) alloy may be 0.01 at % to 0.08 at %.

According to an aspect of the present inventive concept, there is provided a display device, comprising a first substrate including a base layer, and a first wire grid layer which is disposed on the base layer and which include a plurality of first wire metal patterns extending along a first direction, the plurality of first wire metal patterns and spaced apart from each other along a second direction crossing the first direction; a second substrate facing the first substrate; and a liquid crystal layer disposed between the first substrate and the second substrate, wherein the first wire grid layer is made of an aluminum (Al) alloy containing nickel (Ni) and lanthanum (La).

The content of nickel (Ni) in the aluminum (Al) alloy may be 0.01 at % to 0.08 at %, and the content of lanthanum (La) in the aluminum (Al) alloy may be 0.01 at % to 0.08 at %.

The total content of nickel (Ni) and lanthanum (La) in the aluminum (Al) alloy is 0.1 at % or less.

The content of nickel (Ni) in the aluminum (Al) alloy may be 0.02 at %, and the content of lanthanum (La) in the aluminum (Al) alloy may be 0.04 at %.

The first wire grid layer may further include an oxide film formed on a surface of each of the plurality of first wire metal patterns, and the oxide film may be made of an oxide of the aluminum (Al) alloy.

The first wire grid layer may further include a hard mask pattern disposed on each of the plurality of first wire metal patterns.

The first substrate may further include: a first wire metal pattern protection layer disposed on the first wire grid layer;

a thin film transistor disposed on the first wire metal pattern protection layer; an insulation layer disposed on the thin film transistor; and a pixel electrode disposed on the insulation layer and electrically connected with the thin film transistor.

The second substrate may include: a second base layer; and a second wire grid layer which is disposed on one side of the second base layer facing the first substrate and which include a plurality of second wire metal patterns extending along one direction, the plurality of second wire metal patterns and spaced apart from each other along an other direction crossing the one direction.

The one direction may be perpendicular to the first direction.

The second wire grid layer may be made of an aluminum (Al) alloy containing nickel (Ni) and lanthanum (La).

The second substrate may further include: a second wire metal pattern protection layer disposed on the second wire grid layer; and a light-blocking member disposed on the second wire metal pattern protection layer.

BRIEF DESCRIPTION OF THE DRAWINGS

The above and other aspects and features of the present inventive concept will become more apparent by describing in detail exemplary embodiments thereof with reference to the attached drawings, in which.

DETAILED DESCRIPTION OF THE EMBODIMENTS

Figure 1:
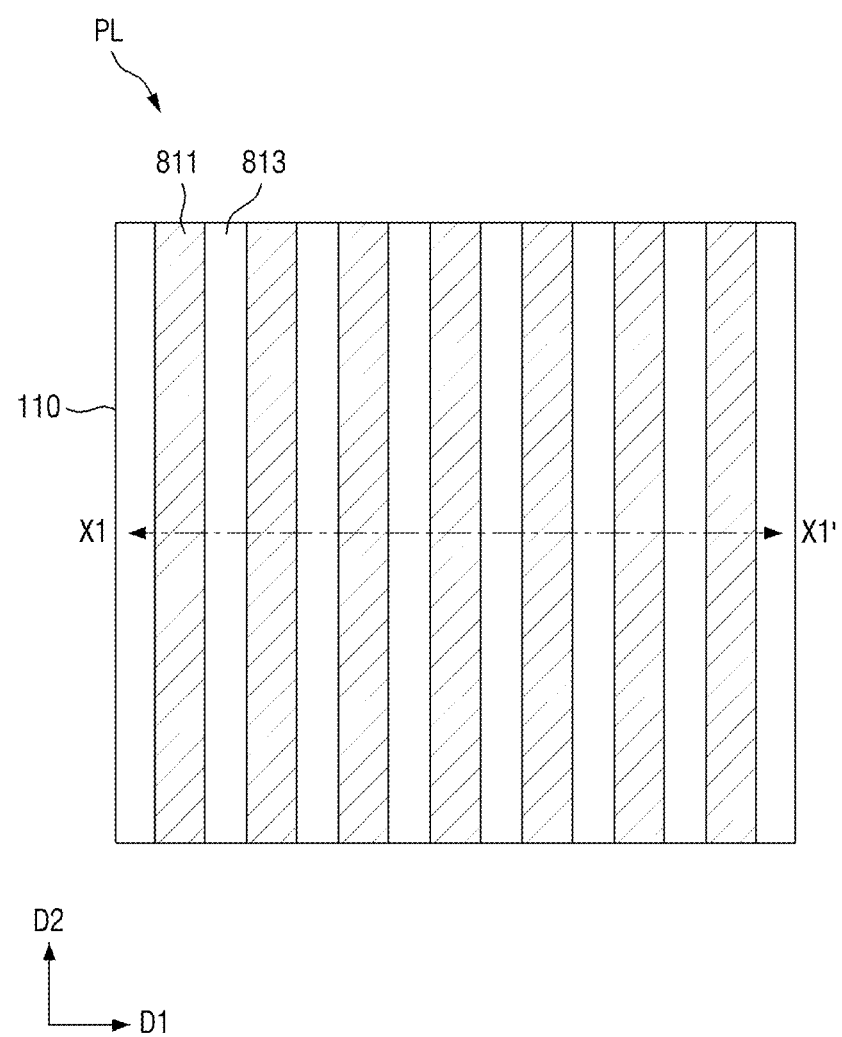
FIG. 1 is a plan view of a polarizer according to an embodiment of the present inventive concept.

Features of the inventive concept and methods of accomplishing the same may be understood more readily by reference to the following detailed description of embodiments and the accompanying drawings. The inventive concept may, however, be embodied in many different forms and should not be construed as being limited to the embodiments set forth herein. Rather, these embodiments are provided so that this disclosure will be thorough and complete and will fully convey the concept of the inventive concept to those skilled in the art, and the inventive concept will only be defined by the appended claims. Like reference numerals refer to like elements throughout the specification.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on", "directly connected to" or "directly coupled to" another element or layer, there are no intervening elements or layers present. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the inventive concept.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Unless otherwise defined, all terms (including technical and scientific terms) used herein have the same meaning as commonly understood by one of ordinary skill in the art to which the present application belongs. It will be further understood that terms, such as those defined in commonly used dictionaries, should be interpreted as having a meaning that is consistent with their meaning in the context of the relevant art and this specification and will not be interpreted in an idealized or overly formal sense unless expressly so defined herein.

Like reference characters are used throughout the specification to indicate like or similar elements.

Hereinafter, embodiments of the present inventive concept will be described with reference to the attached drawings.

Figure 2:
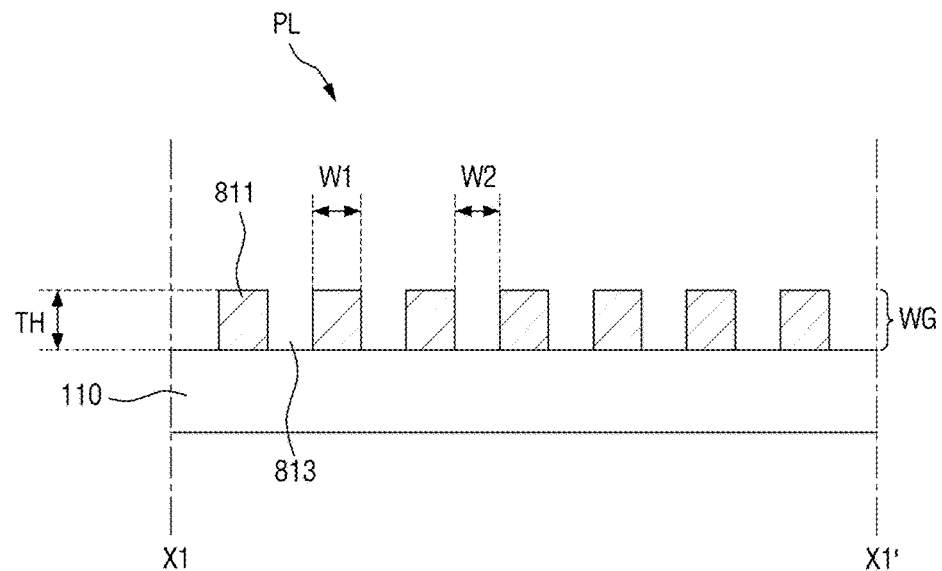
FIG. 2 is a sectional view of the polarizer shown in FIG. 1, taken along the line X1-X1' of FIG. 1.

FIG. 1 is a plan view of a polarizer according to an embodiment of the present inventive concept, and FIG. 2 is a sectional view of the polarizer shown in FIG. 1, taken along the line X1-X1' of FIG. 1.

Referring to FIGS. 1 and 2, the polarizer PL according to an embodiment of the present inventive concept includes a base layer 110 and a wire grid layer WG disposed on the base layer 110.

The base layer 110 may include a transparent insulation substrate. Here, transparency may include transparency of 100%, as well as semi-transparency to satisfy the transmittance set forth in a predetermined design condition. For example, the base layer 110 may include a glass substrate, a quartz substrate, a transparent resin substrate, or the like. Further, the base layer 110 may include a polymer or plastic having high thermal resistance. In some embodiments, the base layer 110 may have flexibility. That is, the base layer 110 may be a substrate whose shape can be changed by rolling, folding, bending, or the like.

The wire grid layer WG may be disposed on the base layer 110.

The wire grid layer WG may polarize the light passing through the base layer 110, and may include a plurality of wire metal patterns 811 spaced apart from each other at predetermined intervals.

The wire metal patterns 811 may have a first width W1 and extend along a second direction D2, and may be spaced apart from each other with a gap 813 having a second width W2 therebetween to be arranged in parallel and regularly along a first direction D1. The wire metal patterns 811 may be arranged in a period shorter than the wavelength of visible light. In order for the wire grid layer WG to perform an excellent polarization function, the second width W2 of the gap 813 must be shorter than the wavelength of incident light. For example, when incident light is visible light, since the wavelength of the visible light is 400 nm to 700 nm, polarization characteristics can be expected only when the second width W2 is about 400 nm. Therefore, in order to exhibit an excellent polarization function, the second width W2 may be 100 nm or less. The first width W1 of the wire metal patterns 811 not passing light may also be 100 nm or less. In some embodiments, the ratio of first width W1 and second width W2 may be about 1:1. For example, the first width W1 may be 30 nm to 60 nm, and the second width W2 may be 30 nm to 60 nm. However, the present inventive concept is not limited thereto, and the first width W1 of the wire metal pattern 811, the second with W2 of the gap 813, and the period of the wire metal patterns 811, for example, the sum of the first width W1 and the second width W2, may be appropriately selected depending on the wavelength of light to be polarized.

The difference in height TH between the wire metal patterns 811 may be 20 nm or less. In other words, when some of the heights of the wire metal patterns 811 are different, the difference between the maximum height and minimum height of the wire metal patterns 811 may be 20 nm. In some embodiments, the heights TH between the wire metal patterns 811 may be substantially equal to each other.

Light proceeds while irregularly vibrating in horizontal and vertical directions in relation to the propagation direction thereof. Therefore, when light is incident on the wire metal patterns 811, only the light vibrating in a direction perpendicular to the extension direction of the wire metal patterns 811 passes through the wire grid layer WG.

Furthermore, other light not having passed through the wire grid layer WG is reflected by the wire metal patterns 811. That is, only the P-polarized light passes through the wire grid layer WG, and the S-polarized light does not pass through the wire grid wire WG and is reflected. As a result, only the P-polarized light proceeds in an upward direction of the wire grid layer WG.

Moreover, the S-polarized light reflected by the wire metal patterns 811 is scattered by a light guide plate provided in a backlight unit (not shown) under the wire grid layer WG in a display device to offset polarization, and is then reflected again by a reflector provided in the backlight unit to be incident on the wire grid layer WG again. These procedures may be repeated. Therefore, light can be recycled, so as to improve light efficiency and obtain the effects of power consumption reduction and/or brightness enhancement of a display device.

The wire grid layer WG or the wire metal patterns 811 may be made of an aluminum (Al) alloy containing nickel (Ni) and lanthanum (La) as impurity elements.

Aluminum (Al) has low heat resistance because of low melting point. Therefore, when aluminum (Al) is exposed to a high temperature of 200° C. or higher or 400° C. or higher, hillocks, which are semi-spherical protrusions, may occur, and thus there is a possibility of making the wire metal patterns 811 of the wire grid layer WG poor.

The wire grid layer WG according to an embodiment of the present inventive concept may be made of an aluminum (Al) alloy, and the aluminum (Al) alloy may contain nickel (Ni) and lanthanum (La) as impurity elements in a predetermined range in consideration of heat resistance and good reflectivity.

The content of lanthanum (La) in the aluminum (Al) alloy may be 0.01 at % to 0.08 at %. Here, at % means an atomic percentage. In terms of improving heat resistance and preventing the occurrence of hillocks, the content of lanthanum (La) in the aluminum (Al) alloy may be 0.01 at % or more. Further, in terms of improving heat resistance, it is advantageous that the content of lanthanum (La) is higher, but when the content of lanthanum (La) is excessively high, the reflectance of the wire grid layer WG may be lowered. Therefore, the upper limit of the content of lanthanum (La) may be 0.08 at %. In some embodiments, the content of lanthanum (La) in the aluminum (Al) alloy may be 0.04 at % in order to improve heat resistance in a high-temperature environment of 400° C. or higher.

The content of nickel (Ni) in the aluminum (Al) alloy may be 0.01 at % to 0.08 at %. Nickel (Ni) may contribute to the improvement of heat resistance of the aluminum (Al) and the increase of crystal grains in the aluminum (Al) alloy. In terms of improving heat resistance, the content of nickel (Ni) in the aluminum (Al) alloy may be 0.01 at % or more. Further, in terms of improving heat resistance, it is advantageous that the content of nickel (Ni) becomes higher, but when the content of nickel (Ni) is excessively high, the crystal grains (for example, Al crystal grains) of the aluminum (Al) alloy become excessively large, and thus unevenness increases. Therefore, the upper limit of the content of nickel (Ni) may be 0.08 at %. In some embodiments, the content of nickel (Ni) in the aluminum (Al) alloy may be 0.02 at % in order to improve heat resistance in a high-temperature environment of 400° C. or higher.

The total content of the impurity elements in the aluminum (Al) alloy, illustratively, the total content of nickel (Ni) and lanthanum (La) may be 0.1 at % or less. As described above, when the content of the impurity elements in the aluminum (Al) alloy becomes higher, it is advantageous in terms of heat resistance, but when the content of the impurity elements is excessively high, there is a possibility of decreasing reflectance or increasing unevenness. Therefore, the content of the impurity elements in the aluminum (Al) alloy may be 0.1 at % or less.

The wire grid layer WG according to an embodiment of the present inventive concept may be made of an aluminum (Al) alloy, and the aluminum (Al) alloy may contain nickel (Ni) and lanthanum (La) as impurity elements. The aluminum (Al) alloy may have an optical constant (or complex refractive index) represented by 'n+ik'. Here, n means a refractive index, k means an extinction coefficient, and i means an imaginary number in a complex number. It is preferable that the metal constituting the wire grid layer WG is a metal having a large extinction coefficient k. When the visible range mean value of the extinction coefficient k (average extinction coefficient) is large, the transmittance of P-polarized light increases even when the refractive index n is any numerical value of a general metal, so as to constitute an excellent wire grid polarizer. Particularly, in the case of a wire grid polarizer, the transmittance of P-polarized light increases as k increases and n decreases, under a condition that the extinction coefficient k is 4 or more. Meanwhile, when the extinction coefficient k increases or when both the extinction coefficient k and the refractive index n increase, the transmittance of S-polarized light may decrease. Therefore, the extinction ratio (transmittance of P-polarized light/transmittance of S-polarized light) can be improved. The wire grid layer WG according to the present inventive concept may contain an aluminum (Al) having a refractive index n of 0.9 to 1.1 and an extinction coefficient k of 6.4 or more, and thus the transmittance and reflectance of the polarizer can be improved.

Further, the content of nickel (Ni) in the aluminum (Al) alloy and the content of lanthanum (La) in the aluminum (Al) alloy may be appropriately adjusted to such an extent satisfying the range of the aforementioned refractive index n and extinction coefficient k.

Since the aforementioned polarizer PL, as described above, contain excellent heat resistance and/or optical properties, this polarizer PL has advantages of high reliability and excellent optical properties.

Figure 3:
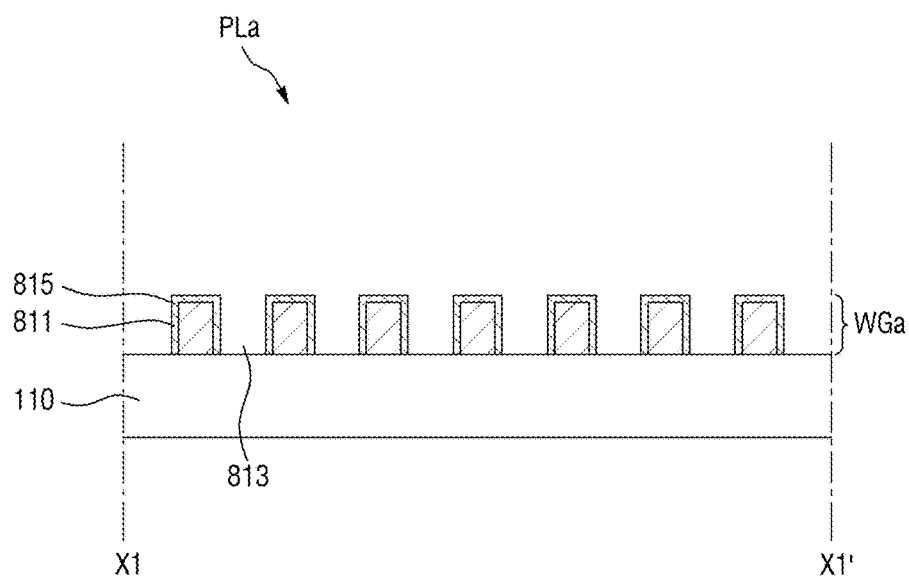
FIG. 3 is a sectional view of a polarizer according to another embodiment of the present inventive concept, taken along the line X1-X1' of FIG. 1.

FIG. 3 is a sectional view of a polarizer according to another embodiment of the present inventive concept, taken along the line X1-X1' of FIG. 1.

Referring to FIG. 3, the polarizer PLa according to this embodiment includes a base layer 110 and a wire grid layer WGa disposed on the base layer 110.

In the polarizer PLa according to this embodiment, the wire grid layer WGa is different from the aforementioned wire grid layer WG shown in FIG. 2 in that this wire grid layer WGa further includes an oxide film 815. Other components of the polarizer PLa are substantially identical to or similar to those of the polarizer PL. Therefore, hereinafter, differences will be mainly described.

The oxide film 815 may be disposed on the surface of each of the wire metal patterns 811, and may cover the lateral sides of each of the wire metal patterns 811 as well as the upper side thereof. As described above, each of the wire metal patterns 811 may be made of an aluminum (Al) alloy containing nickel (Ni) and lanthanum (La). Thus, each of the wire metal patterns 811 may be naturally oxidized, and thus the oxide film 815 may be formed on the surface of each of the wire metal patterns 811. Since the oxide film 815 may be formed by the oxidization of each of the wire metal patterns 811, this oxide film 815 may be made of an oxide of an aluminum (Al) alloy containing nickel (Ni) and lanthanum (La), such as $(Al)_a(Ni)_b(La)_c(O)_d$. Here, each of a, b, c, and d may be a positive real number.

Figure 4:
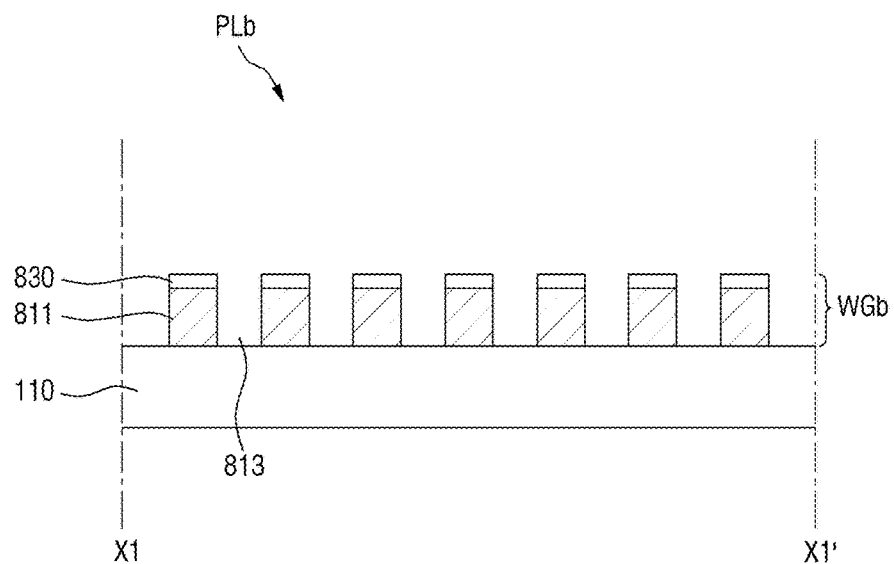
FIG. 4 is a sectional view of a polarizer according to still another embodiment of the present inventive concept, taken along the line X1-X1' of FIG. 1.

FIG. 4 is a sectional view of a polarizer according to still another embodiment of the present inventive concept, taken along the line X1-X1' of FIG. 1.

Referring to FIG. 4, the polarizer PLb according to this embodiment includes a base layer 110 and a wire grid layer WGb disposed on the base layer 110.

In the polarizer PLb according to this embodiment, the wire grid layer WGb is different from the aforementioned wire grid layer WG shown in FIG. 2 in that this the wire grid layer WGb further includes a hard mask pattern 830. Other components of the polarizer PLb are substantially identical to or similar to those of the polarizer PL. Therefore, hereinafter, differences will be mainly described.

The hard mask pattern 830 may be disposed on the surface of each of the wire metal patterns 811. The hard mask pattern 830 is used as a mask during the process of forming the wire metal patterns 811. The hard mask pattern 830 may contain an inorganic insulation material, such as silicon nitride (SiNx) or silicon oxide (SiOx). Illustratively, the hard mask pattern 830 may contain silicon dioxide ($SiO_2$). In some embodiments, the hard mask pattern 830 may remain without being removed, after the formation of the wire metal patterns 811.

Figure 5:
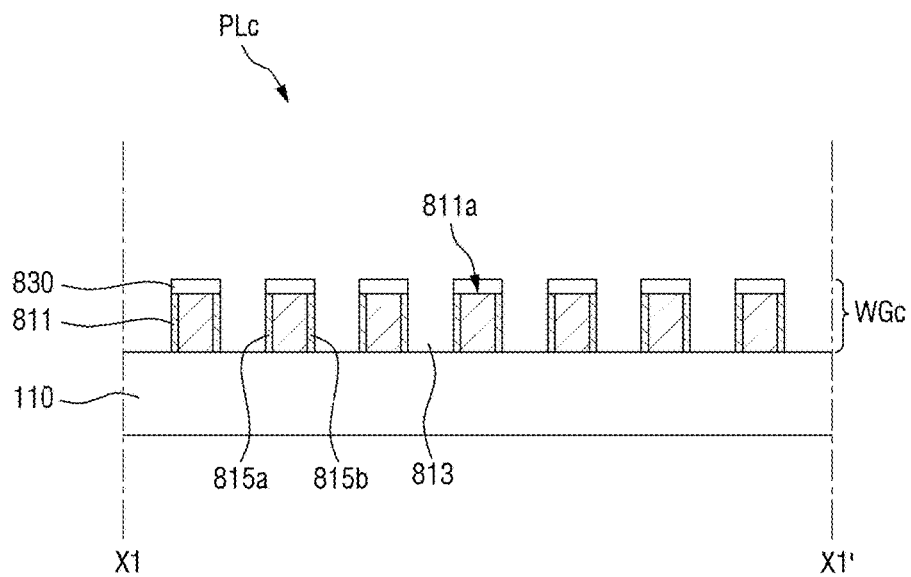
FIG. 5 is a sectional view of a polarizer according to still another embodiment of the present inventive concept, taken along the line X1-X1' of FIG. 1.

FIG. 5 is a sectional view of a polarizer according to still another embodiment of the present inventive concept, taken along the line X1-X1' of FIG. 1.

Referring to FIG. 5, the polarizer PLc according to this embodiment includes a base layer 110 and a wire grid layer WGc disposed on the base layer 110.

In the polarizer PLc according to this embodiment, the wire grid layer WGc is different from the aforementioned wire grid layer WGb shown in FIG. 4 in that this wire grid layer WGc further includes oxide films 815a and 815b. Other components of the polarizer PLc are substantially identical to or similar to those of the polarizer PLb. Therefore, hereinafter, differences will be mainly described.

The oxide films 815a and 815b may be respectively disposed on the lateral sides of the wire metal pattern 811 not covered by the hard mask pattern 830, and an oxide film may not be formed on the upper surface 811a of the wire metal pattern 811 covered by the hard mask pattern 830.

As described above with reference to FIG. 3, the wire metal pattern 811 may be made of an aluminum (Al) alloy containing nickel (Ni) and lanthanum (La). The upper surface 811a of the wire metal pattern 811 covered by the hard mask pattern 830 is not exposed to air, whereas the lateral sides of the wire metal pattern 811 not covered by the hard mask pattern 830 may be initially exposed to air. Therefore, the oxide films 815a and 815b may be disposed on the lateral sides of the wire metal pattern 811. As described above, the oxide films 815a and 815b may be made of an oxide of an aluminum (Al) alloy containing nickel (Ni) and lanthanum (La), such as $(Al)_a(Ni)_b(La)_c(O)_d$.

FIGS. 6 to 16 are sectional views showing the processes of manufacturing the polarizers shown in FIGS. 1 to 5.

Figure 6:
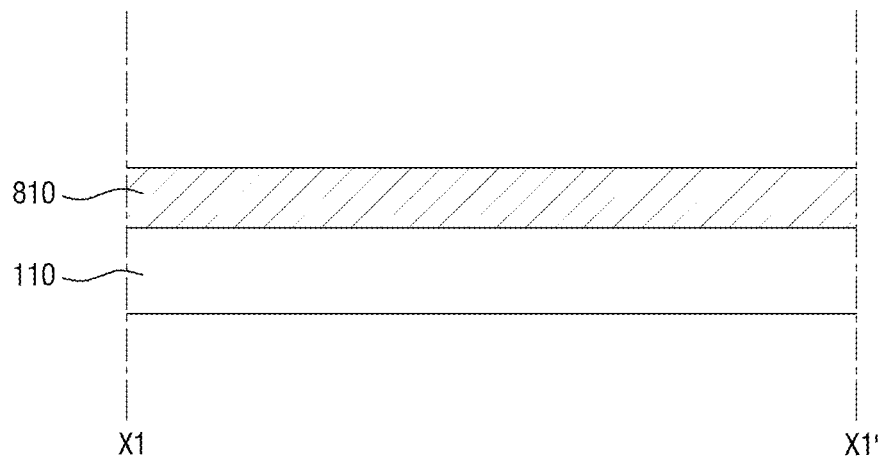
FIGS. 6, 7, 8, 9, 10, 11, 12, 13, 14, 15, and 16 are sectional views showing the processes of manufacturing the polarizers shown in FIGS. 1, 2, 3, 4, and 5.

Referring to FIGS. 6 to 16, first, as shown in FIG. 6, a metal layer 810 is formed on a base layer 110. The metal layer 810 may be made of an aluminum (Al) alloy containing nickel (Ni) and lanthanum (La). The content of lanthanum (La) in the aluminum (Al) alloy may be 0.01 at % to 0.08 at %, and the content of nickel (Ni) in the aluminum (Al) alloy may be 0.01 at % to 0.08 at %. In some embodiments, the content of lanthanum (La) may be 0.04 at %, and the content of nickel (Ni) may be 0.02 at %. Further, the metal layer 810 may be made of an aluminum (Al) alloy containing nickel (Ni) and lanthanum (La), and the aluminum (Al) alloy may have an extinction coefficient k of 6.4 or more and a refractive index of 0.9 to 1.1. A detailed description thereof, which has been described with reference to FIGS. 1 and 2, will be omitted. In some embodiments, the metal layer 810 may be formed on the base layer 110 through sputtering.

Figure 7:
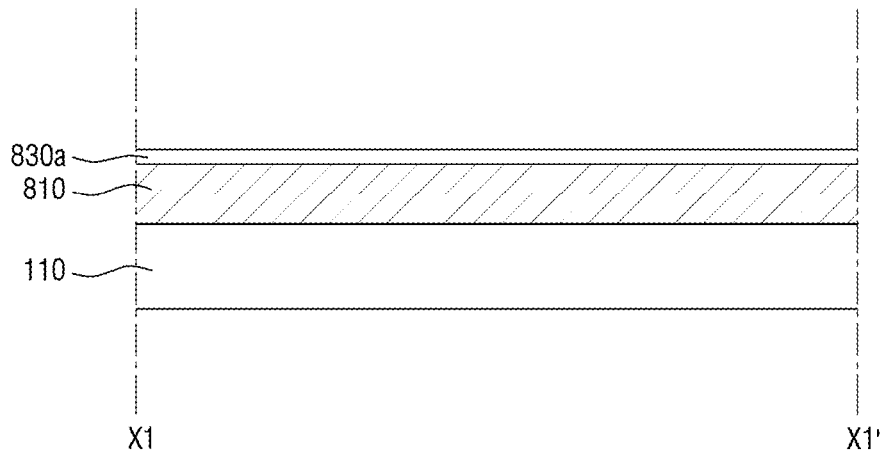

Next, as shown in FIG. 7, a hard mask layer 830a is formed on the metal layer 810. The hard mask layer 830a may contain an inorganic insulation material, such as silicon nitride (SiNx) or silicon oxide (SiOx).

The hard mask layer 830a may be formed on the metal layer 810 by chemical vapor deposition, and the chemical vapor deposition may be performed at a high-temperature environment of 200° C. or higher or 400° C. or higher. Thus, in the process of forming the hard mask layer 830a, the metal layer 810 may also be exposed to high temperature. Therefore, if the metal layer 810 is formed using aluminum (Al), due to the low heat resistance of Al, defects, such as hillocks, may occur in the metal layer 810. On the other hand, according to embodiments of the present inventive concept, since the metal layer 810 is formed using an aluminum (Al) alloy containing nickel (Ni) and lanthanum (La), having high heat resistance, there is an advantage of lowering the possibility of occurrence of defectives, such as hillocks.

Figure 8:
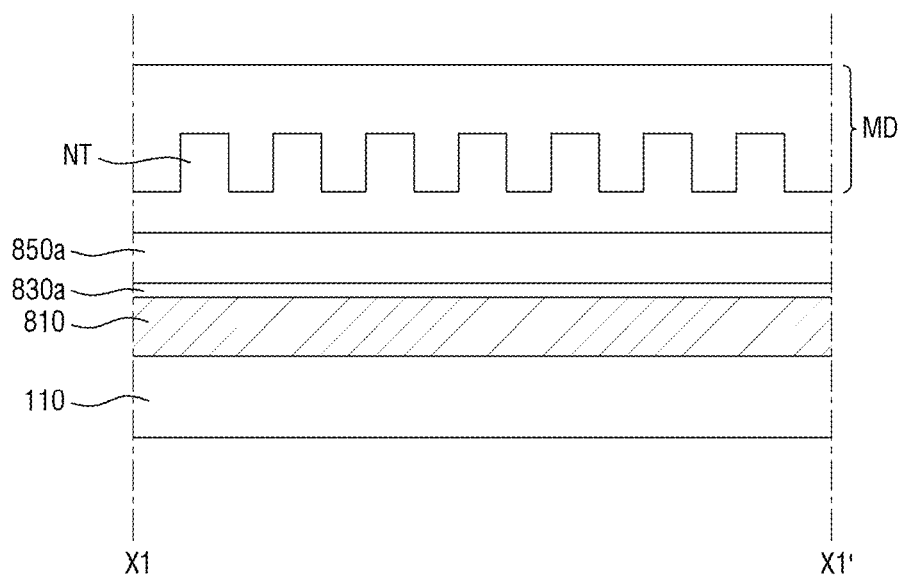

Next, as shown in FIG. 8, a resist layer 850a is formed on the hard mask layer 830a. The resist layer 850a may contain a thermosetting resin or a photocurable resin, which is generally used in the related field. Examples of the thermosetting resin may include a urea resin, a melamine resin, and a phenol resin. Further, examples of the photocurable resin may include, but are not limited to, a polymerizable compound having a polymerizable functional group, a photopolymerization initiator for initiating the polymerization reaction of the polymerizable compound through light irradiation, a surfactant, and an antioxidant. Hereinafter, a case that the resist layer 850a contains a photocurable resin will be exemplified.

Subsequently, a mold MD including a pattern (NT, PT) in which recesses NT and projections PT are repeatedly arranged is disposed over the resist layer 850a. In some embodiments, the mold MD may have flexibility and may contain a polymer material having high light transmittance.

Figure 9:
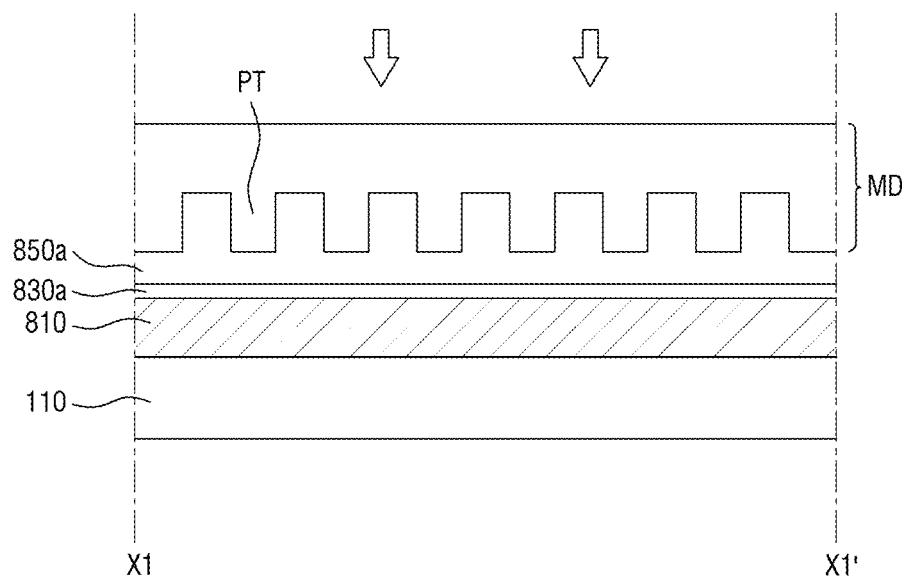

Next, as shown in FIG. 9, the mold MD is brought into contact with the resist layer 850a, and presses the resist layer 850a so as to transfer the pattern (NT, PT) of the mold MD to the resist layer 850a. That is, the pattern (NT, PT) of the mold MD may be transferred to the resist layer 850a through a nano-imprint process.

Subsequently, the resist layer 850a is irradiated with light to cure the resist layer 850a. In some embodiments, since the mold MD may contain a material having high light transmittance, the light passes through the mold MD to be applied to the resist layer 850a.

Figure 10:
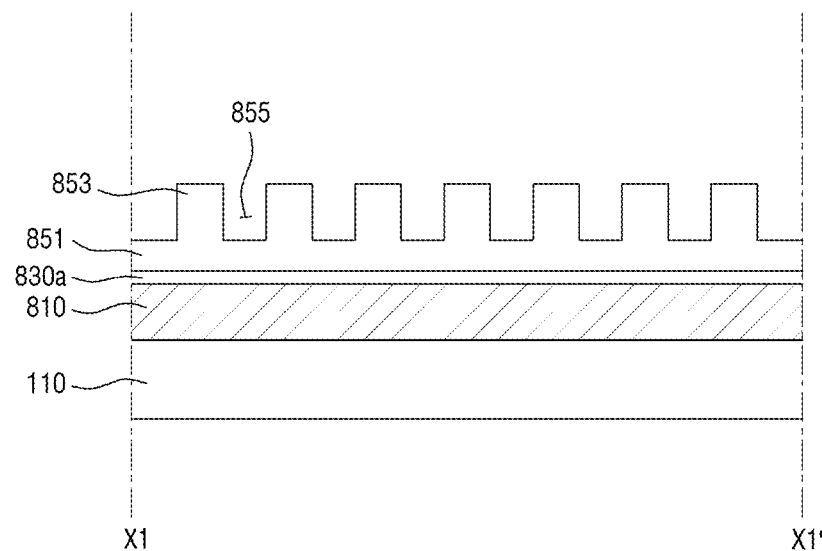

Subsequently, when the mold MD is removed from the cured resist layer 850a, as shown in FIG. 10, a remaining portion 851 and a plurality of resist patterns 853 disposed on the remaining portion 851 and spaced apart from each other with a gap 855 therebetween may be formed.

As described above, in the present inventive concept, since the metal layer 810 is made of an aluminum (Al) alloy having excellent heat resistance, a possibility of occurrence of hillocks is low even when the metal layer 810 is exposed to a high-temperature environment. Therefore, the surface of the metal layer 810 is maintained to be flat, and thus the remaining portion 851 may also be formed to have uniform thickness.

Figure 11:
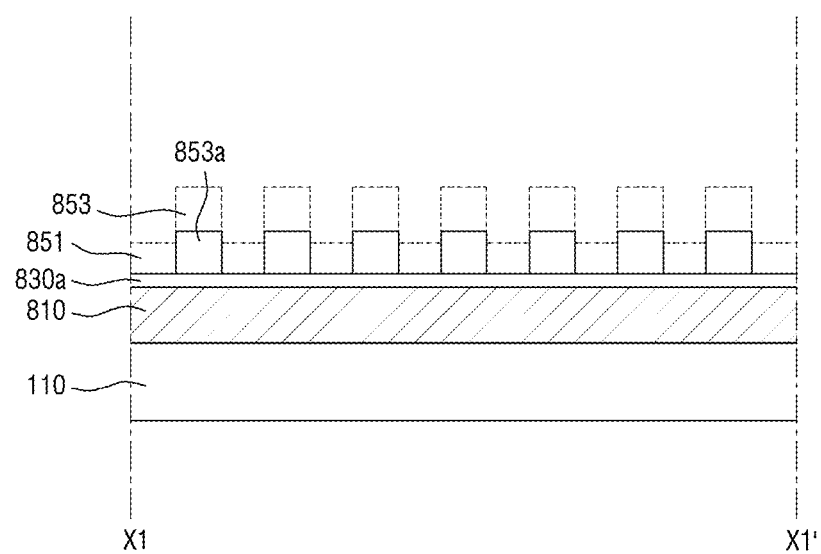

Subsequently, the remaining portion 851 is removed through an ashing process. The thickness of the resist pattern 853 may decrease in the process of removing the remaining portion 851, and thus, as shown in FIG. 11, sub-resist patterns 853a may be formed. When the remaining portion 851 is removed, a portion of the hard mask layer 830a, the portion being located between the sub-resist patterns 853a, may be exposed.

Figure 12:
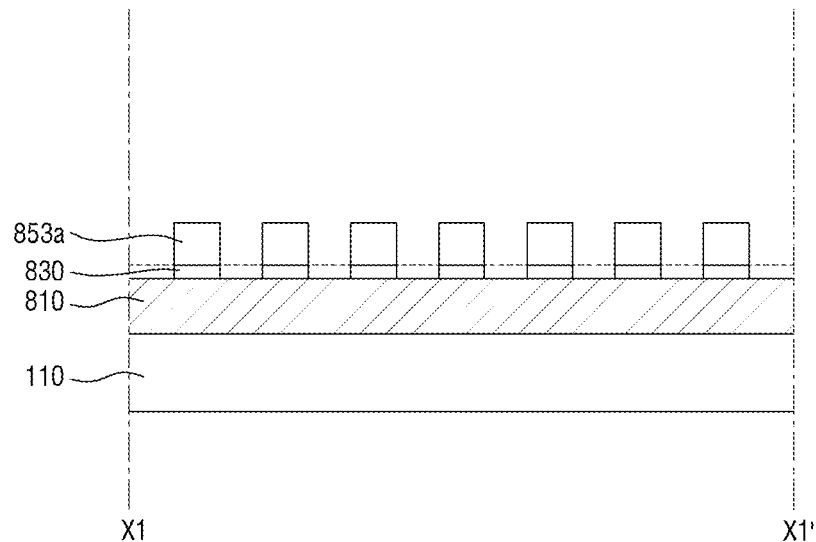

The hard mask layer 830a is etched using the sub-resist patterns 853a as an etching mask. As shown in FIG. 12, hard mask patterns 830 are formed on a portion of the hard mask layer 830a, the portion being covered by the sub-resist patterns 853a. A portion of the hard mask layer 830a, the portion not being covered by the sub-resist patterns 853a, is removed, and thus a part of the metal layer 810 may be exposed.

Figure 13:
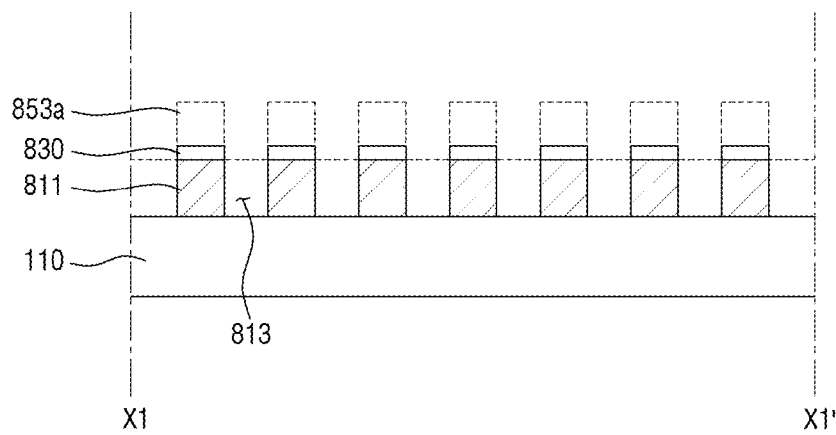

Subsequently, the metal layer 810 is etched using the hard mask patterns 830 as a mask. As shown in FIG. 13, wire metal patterns 811 may be formed on a portion of the metal layer 810, the portion being covered by the hard mask patterns 830. A portion of the metal layer 810, the portion not being covered by the hard mask patterns 830, may be removed, and thus a gap 813 may be formed between the wire metal patterns 811 adjacent to each other.

The sub-resist patterns 853a may be removed together in the process of etching the metal layer 810. Even after the wire metal patterns 811 are formed by etching the metal layer 810, some of sub-resist patterns 853a may remain on the hard mask patterns 830. In this case, a process of removing the sub-resist patterns 853a (for example, ashing process) may be additionally performed.

Through the above-described processes, the polarizer (PLb of FIG. 4) having been described with reference to FIG. 4 may be manufactured.

Figure 14:
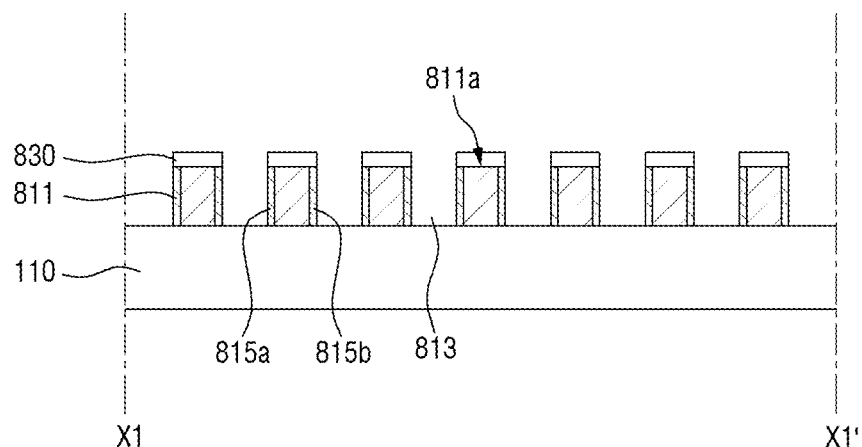

Meanwhile, as shown in FIG. 14, when oxide films 815a and 815b are formed on the lateral sides of the wire metal pattern 811 by natural oxidation in a state where the hard mask patterns 830 are disposed on the wire metal patterns 811, the polarizer (PLc of FIG. 5) having been described with reference to FIG. 5 may be manufactured.

Figure 15:
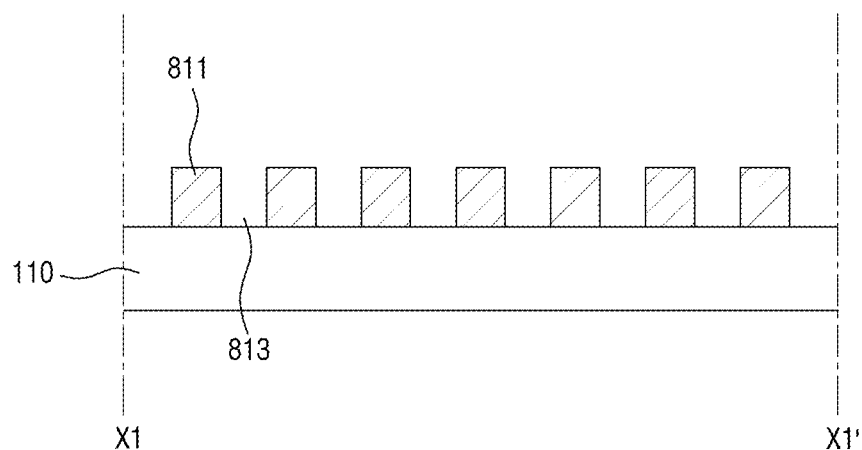

Meanwhile, as shown in FIG. 15, when the hard mask patterns 830 disposed on the wire metal patterns 811 are removed through an additional process, the polarizer (PL of FIG. 2) having been described with reference to FIGS. 1 and 2 may be manufactured.

Figure 16:
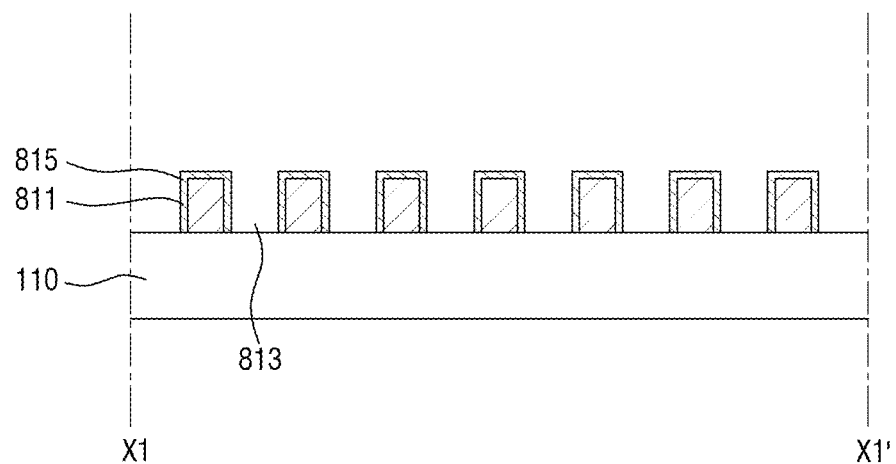

Meanwhile, as shown in FIG. 16, when an oxide film 815 is formed on the surface of each of the wire metal patterns 811 by natural oxidation in a state where the hard mask patterns 830 are removed, the polarizer (PLa of FIG. 3) having been described with reference to FIG. 3 may be manufactured.

Figure 17:
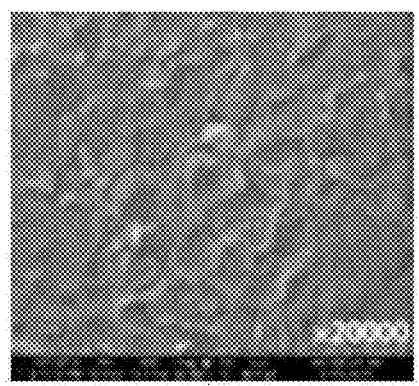
FIG. 17 shows the electron microscope photographs of the surface of a metal layer according to Comparative Example.
Figure 17:
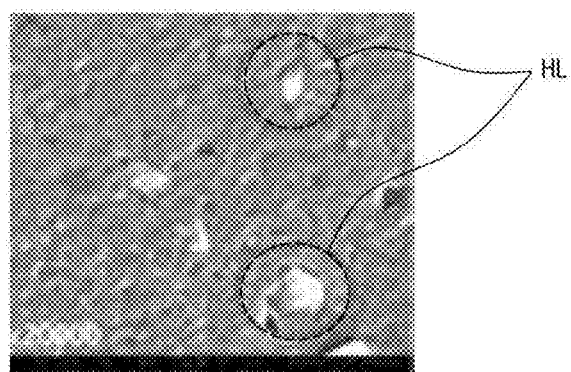
Figure 17:
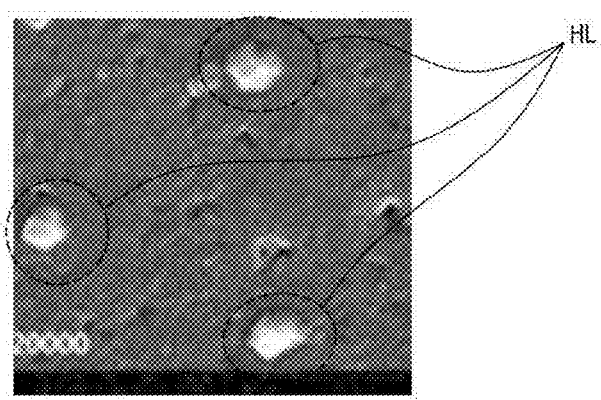
Figure 18:
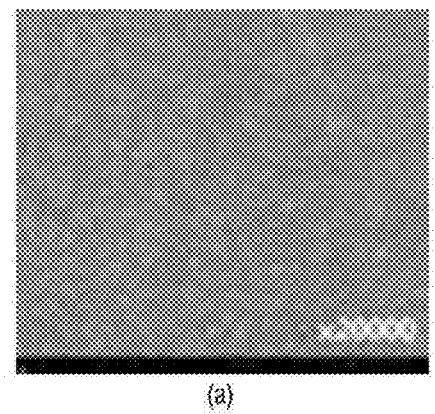
FIG. 18 shows the electron microscope photographs of the surface of a metal layer according to Example of the present inventive concept.
Figure 18:
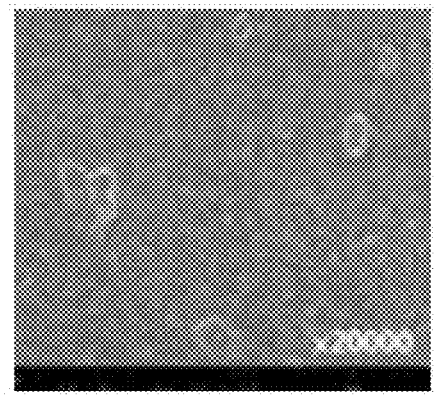
Figure 18:
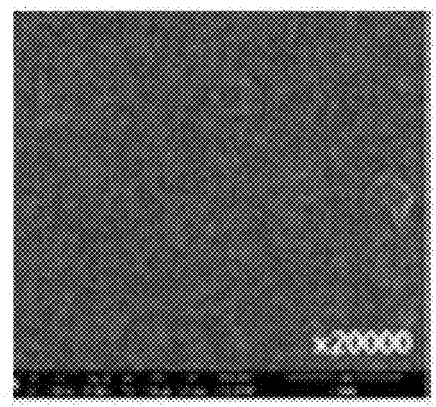

FIG. 17 shows the electron microscope photographs of the surface of a metal layer according to Comparative Examples, and FIG. 18 shows the electron microscope photographs of the surface of a metal layer according to an embodiment of the present inventive concept.

In both FIG. 17 and FIG. 18, whether or not hillocks occur was examined by observing the surface of a metal layer using a scanning electron microscope (SEM). Magnification is 20,000 times.

In FIG. 17, according to Comparative Example, aluminum (Al) was applied to a metal layer for forming a wire grid layer, and, in FIG. 18, according to an embodiment of the present inventive concept, an aluminum (Al) alloy containing 0.02 at % of nickel (Ni) and 0.04 at % of lanthanum (La) was applied to a metal layer.

(a) of FIG. 17 and (a) of FIG. 18 show the surface images of a metal layer when heat-treatment was not performed after the formation of the metal layer, (b) of FIG. 17 and (b) of FIG. 18 show the surface images of a metal layer when the metal layer was exposed to an environment of 400° C. for 30 minutes, and (c) of FIG. 17 and (c) of FIG. 18 show the surface images of a metal layer when the metal layer was exposed to an environment of 450° C. for 30 minutes.

Referring to (a) of FIG. 17, it can be ascertained that the surface of the metal layer according to the Comparative Example is rough. Further, referring to (b) and (c) of FIG. 17, it can be ascertained that hillocks occur when the metal layer according to the Comparative Example is exposed to a high-temperature environment.

In contrast, referring to (a) of FIG. 18, it can be ascertained that the surface of the metal layer according to an embodiment of the present inventive concept is relatively uniform compared to that of the metal layer according to the Comparative Example. Further, referring to (b) and (c) of FIG. 18, it can be ascertained that hillocks do not occur even when the metal layer according to an embodiment of the present inventive concept is exposed to a high-temperature environment.

Figure 19:
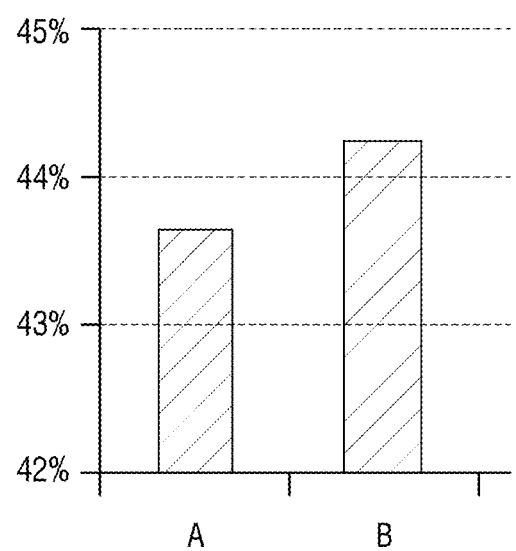
FIG. 19 is a graph showing the transmittance of a polarizer according to Example of the present inventive concept and the transmittance of a polarizer according to Comparative Example.

FIG. 19 is a graph showing the transmittance of a polarizer according to an embodiment of the present inventive concept and the transmittance of a polarizer according to the Comparative Example.

In FIG. 19, A refers to a polarizer according to the Comparative Example, and is a polarizer in which a wire grid layer is made of an aluminum (Al) metal layer having a thickness of 2000□. B refers to a polarizer according to an embodiment of the present inventive concept, and is a polarizer in which a wire grid layer is made of an aluminum (Al) alloy metal layer (containing 0.02 at % of nickel (Ni) and 0.04 at % of lanthanum (La)) having a thickness of 2000□.

Referring to FIG. 19, it can be ascertained that the transmittance of the polarizer according to the Comparative Example (A) is present within a range of 43% to 44%, whereas the transmittance of the polarizer according to an embodiment (B) of the present inventive concept is present within a range of 44% to 45%, and that the transmittance of the polarizer according to an embodiment (B) of the present inventive concept is excellent compared to the transmittance of the polarizer according to the Comparative Example (A).

The aforementioned polarizers according to embodiments of the present inventive concept, as described above, are advantageous in that the possibility of occurrence of defects, such as hillocks, can be lowered by using an aluminum (Al) alloy having excellent heat resistance and optical properties, and in that the transmittance of the polarizer can be improved compared to when aluminum (Al) is used. Therefore, there is an advantage of the reliability and optical properties of the polarizer being improved.

The aforementioned polarizers may be applied to display devices, and the kind of display devices is not limited. Illustratively, the display device may be any one of a twisted nematic (TN) display device, a vertical alignment (VA) type display device, a patterned vertical alignment (PVA) type display device, an in-plane switching (IPS) type display device, a fringe-field switching (FFS) type display device, and a plane to line switching (PLS) type display device. Hereinafter, for the convenience of explanation, a vertical alignment (VA) type display device is exemplified, but the present inventive concept is not limited thereto.

Figure 20:
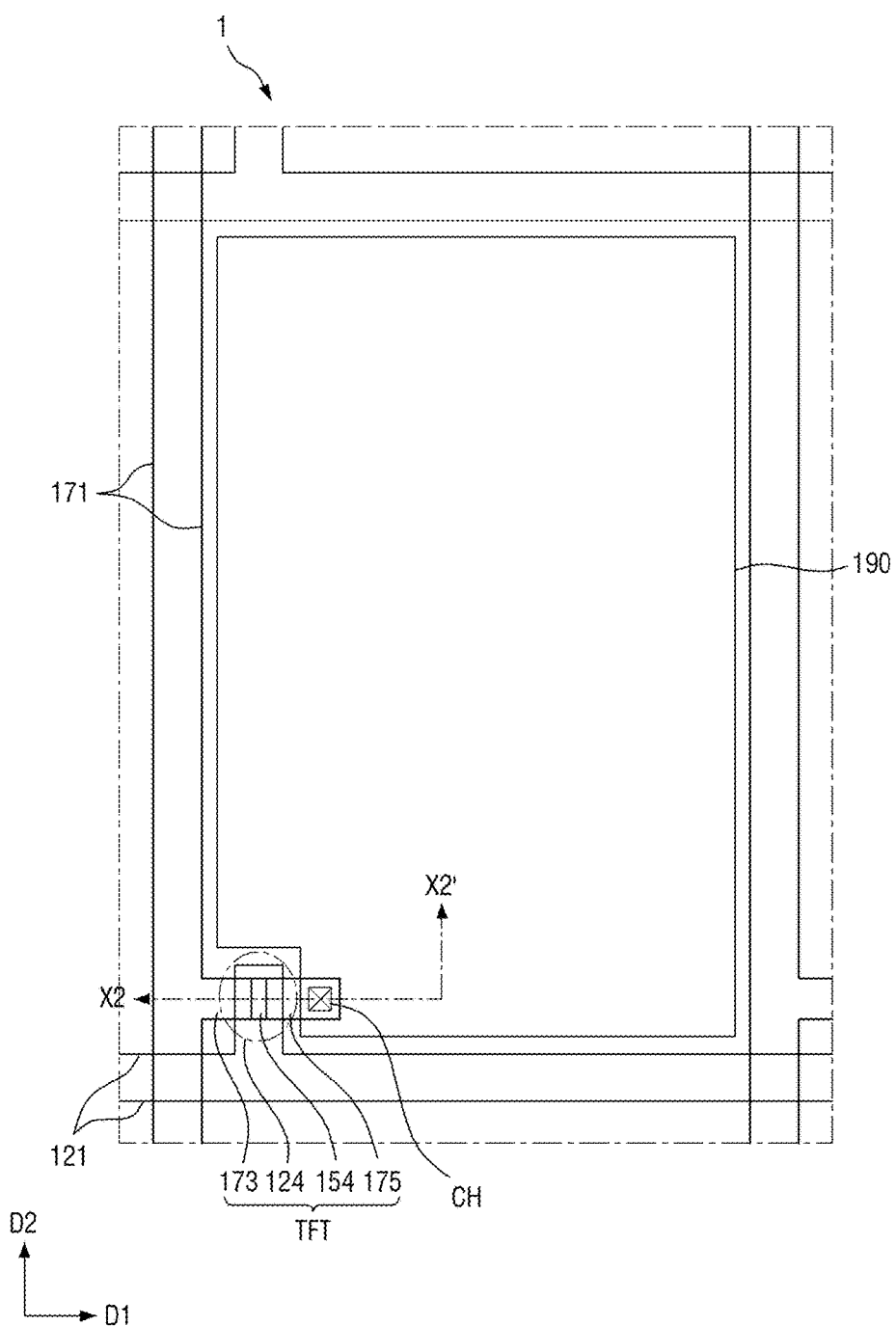
FIG. 20 is an exemplary plan view of one pixel of a display device according to Example of the present inventive concept.
Figure 21:
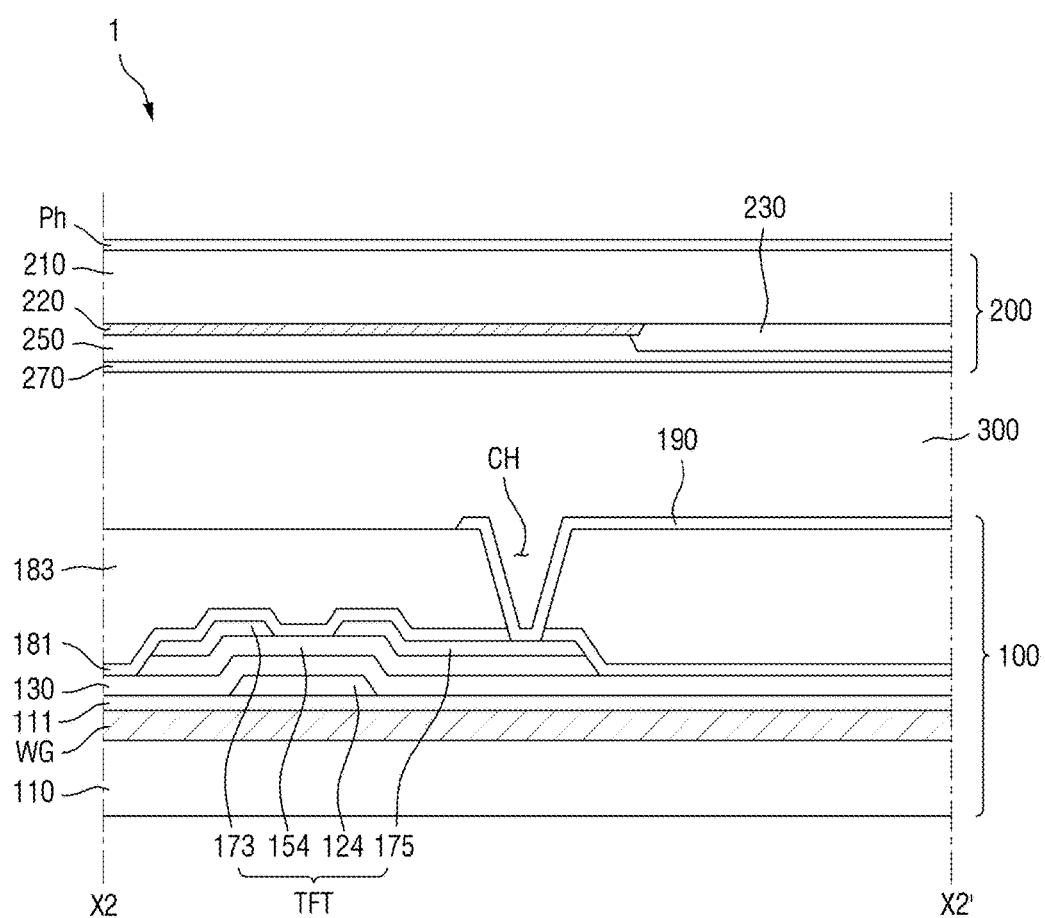
FIG. 21 is a sectional view of the display device shown in FIG. 20, taken along the line X2-X2' of FIG. 20.
Figure 22:
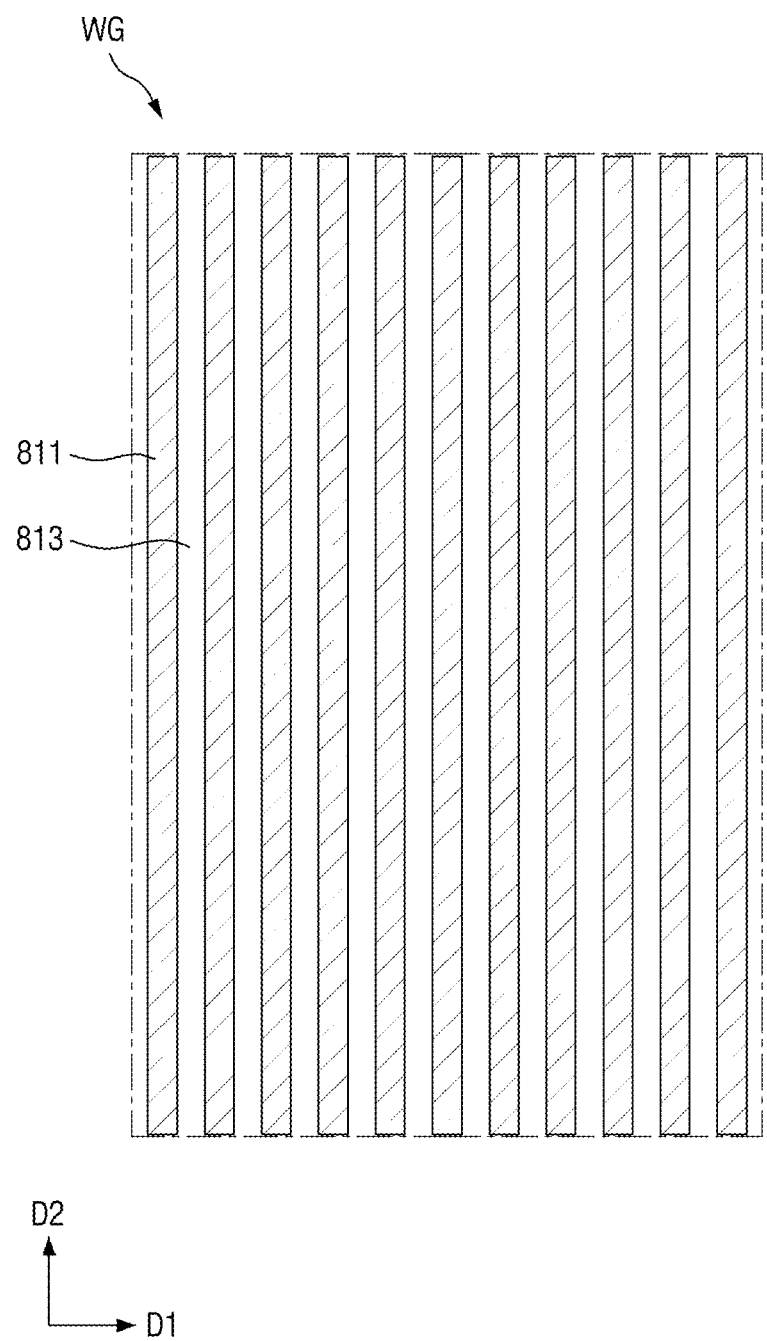
FIG. 22 is a plan view of the wire grid layer shown in FIG. 21.

FIG. 20 is an exemplary plan view of one pixel of a display device according to an embodiment of the present inventive concept, FIG. 21 is a sectional view of the display device shown in FIG. 20, taken along the line X2-X2' of FIG. 20, and FIG. 22 is a plan view of the wire grid layer shown in FIG. 21.

Referring to FIGS. 20 to 22, the display device 1 according to this embodiment includes a first substrate 100, a second substrate 200 disposed to face the first substrate 100, and a liquid crystal layer 300 disposed between the first substrate 100 and the second substrate 200.

Hereinafter, the first substrate 100 will be described.

The first substrate 100 includes a first base layer 110. The first base layer 110 may be made of a transparent insulation material. The first base layer 110 may be substantially the same as the aforementioned base layer (110 of FIG. 3) having been described with reference to FIGS. 1 to 4.

A wire grid layer WG may be disposed on the first base layer 110. The wire grid layer WG may include a plurality of wire metal patterns 811 extending in one direction (for example, second direction D2). The plurality of wire metal patterns 811 may be spaced apart from each other along a direction (for example, first direction D1) crossing the one direction (for example, second direction D2) with a gap 813 therebetween. It is shown in the drawings that the extending direction of the wire metal patterns 811 is the second direction D2, which is the same as the extending direction of data lines to be described later. However, this is only one example, and the present inventive concept is not limited thereto.

The wire grid layer WG may be made of an aluminum (Al) alloy containing nickel (Ni) and lanthanum (La) as impurity elements. A detailed description of this wire grid layer WG will be omitted because it has been described with reference to FIGS. 1 and 2.

A wire metal pattern protection layer 111 may be disposed on the wire grid layer WG. The wire metal pattern protection layer 111 may protect the wire grid layer WG, and may be made of silicon oxide or silicon nitride.

A gate wiring (121, 124) may be disposed on the wire metal pattern protection layer 111. The gate wiring (121, 124) may include a gate line 121 extending in the first direction D1 or horizontal direction, and a gate electrode 124 of a thin film transistor TFT, the gate electrode 124 being connected to the gate line 121.

A gate insulation film 130 may be disposed on the wire metal pattern protection layer 111 and the gate wiring (121, 124). The gate insulation film 130 may be made of an insulation material. Illustratively, the gate insulation film 130 may be made of an inorganic insulation material, such as silicon nitride, silicon oxide, or silicon oxynitride.

A semiconductor layer 154 of the thin film transistor TFT may be disposed on the gate insulation film 130, and at least a part of the semiconductor layer 154 may overlap the gate electrode 124. The semiconductor layer 154 may contain amorphous silicon, polycrystalline silicon, or an oxide semiconductor.

A data wiring (171, 173, 175) is formed on the gate insulation film 130. The data wiring (171, 173, 175) may include a data line 171 extending in the second direction D2 or vertical direction and crossing the gate line 121, a source electrode 173 connected with the data line 171 and extended to the upper portion of the semiconductor layer 154, and a drain electrode separated from the source electrode 173 and overlapping the semiconductor layer 154 formed opposite to the source electrode 173 based on the gate electrode 124.

The gate electrode 124, the source electrode 173, the drain electrode 175, and the semiconductor layer 154 may constitute one thin film transistor (TFT) as a switching device.

A passivation layer 181 is disposed on the thin film transistor TFT. The passivation layer 181 may cover the thin film transistor TFT to protect the thin film transistor TFT. The passivation layer 181 may contain an organic insulation material, or may contain an inorganic insulation material, such as silicon oxide, silicon nitride, or silicon oxynitride.

A planarization layer 183 may be disposed on the passivation layer 181. The planarization layer 183 may have a function of planarizing the upper portion of the passivation layer 181. In some embodiment, the planarization layer 183 may be an organic film. In some embodiments, the planarization layer 183 may be made of a photosensitive organic insulation material.

Although not shown in the drawings, in some embodiments, the planarization layer may contain color pigments passing light having a wavelength of a specific color. That is, the planarization layer 183 may include a plurality of color filters. In this case, a color filter 230 of the second substrate 200 to be described later may be omitted.

A contact hole CH exposing a part of the drain electrode 175 may be formed in the passivation layer 181 and the planarization layer 183.

A pixel electrode 190, which is made of a transparent conductive material, such as indium tin oxide (ITO), indium zinc oxide (IZO), indium tin zinc oxide (ITZO), or Al-doped zinc oxide (AZO), may be disposed on the planarization layer 183. The pixel electrode 190 may be connected with the drain electrode 175 of the thin film transistor TFT through the contact hole CH.

Hereinafter, the second substrate 200 will be described.

The second substrate 200 includes a second base layer 210. The second base layer 210, similarly to the first base layer 110, may be a transparent insulation layer. In some embodiments, the second base layer 210 may have flexibility.

A light-blocking member 220 may be disposed between the second base layer 210 and the liquid crystal layer 300, more specifically, on one side of the second base layer 210. The light-blocking member 220, referred to as black matrix, is configured to prevent light leakage. The light-blocking member 220 may be disposed to overlap the gate line 121, the data line 171, and the thin film transistor TFT. The light-blocking member 220 may be made of chromium oxide or an organic material containing black pigment.

A color filter 230 may be disposed on one side of the second base layer 210 to overlap the pixel electrode 190 of the second base layer 110. The color filter 230 may display any one of three primary colors, such as red, green, and blue colors.

However, the present inventive concept is not limited to these three primary colors, such as red, green, and blue colors, and the color filter 230 may also display any one of cyan, magenta, yellow, and white colors. In some embodiments, the color filter 230 may overlap a part of the pixel electrode 190 or the entire pixel electrode 190.

An overcoat layer 250 is formed on the light-blocking member 220 and the color filter 230. The overcoat layer 250 serves to reduce the step caused by the color filter 230 or the light-blocking member 220 and planarize one side of the second base layer 210. In some embodiments, the overcoat layer 250 may also be omitted.

A common electrode 270 may be disposed on the overcoat layer 150. The common electrode 270 is made of a transparent conductive material, such as indium tin oxide (ITO) or indium zinc oxide (IZO), and serves to adjust the arrangement of liquid crystal molecules in the liquid crystal layer 300 together with the pixel electrode 190 by applying a voltage.

A polarizer Ph may be disposed on the other side of the second base layer 210. The polarizer Ph may be an extensible polarization film.

The liquid crystal layer 300 may be disposed between the first substrate 100 and the second substrate 200. The liquid crystal layer 300 includes a plurality of liquid crystal molecules. The arrangement of the liquid crystal molecules is changed by the electric field formed in the liquid crystal layer 300 or the difference in voltage between the pixel electrode 190 and the common electrode 270, so as to determine the transmittance of incident light.

Figure 23:
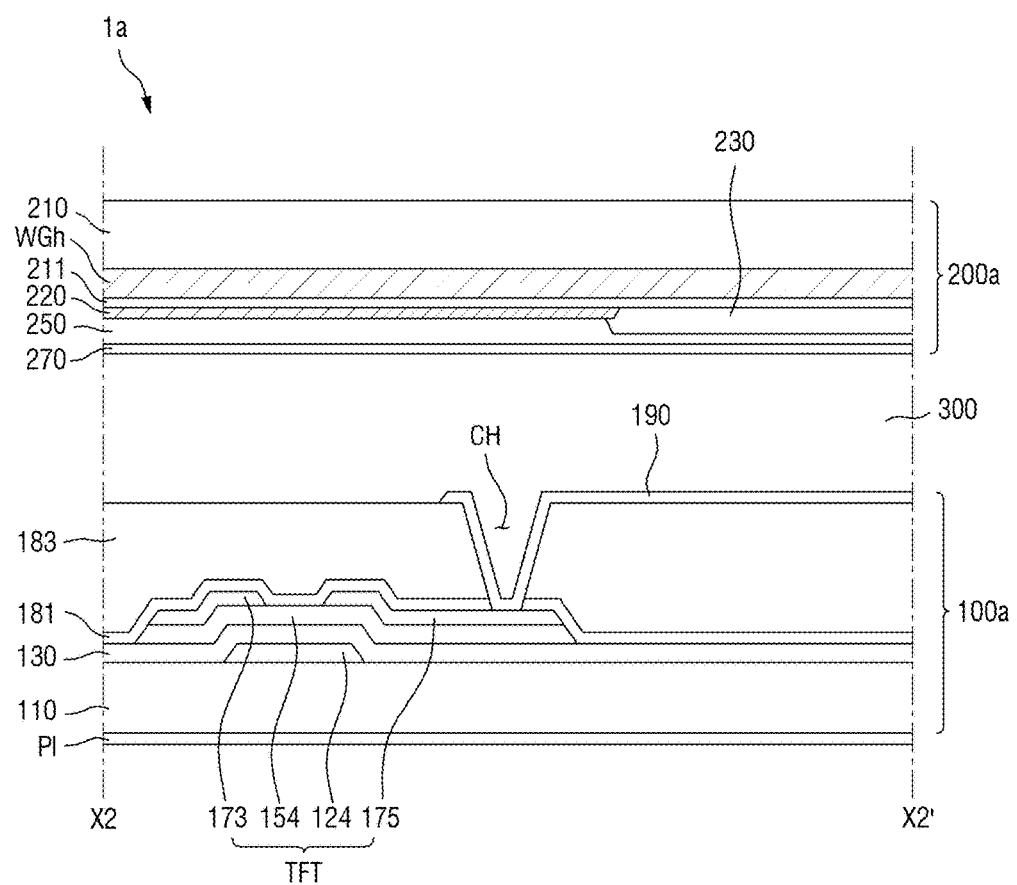
FIG. 23 is a sectional view of a display device according to another embodiment of the present inventive concept, taken along the line X2-X2' of FIG. 20.
Figure 24:
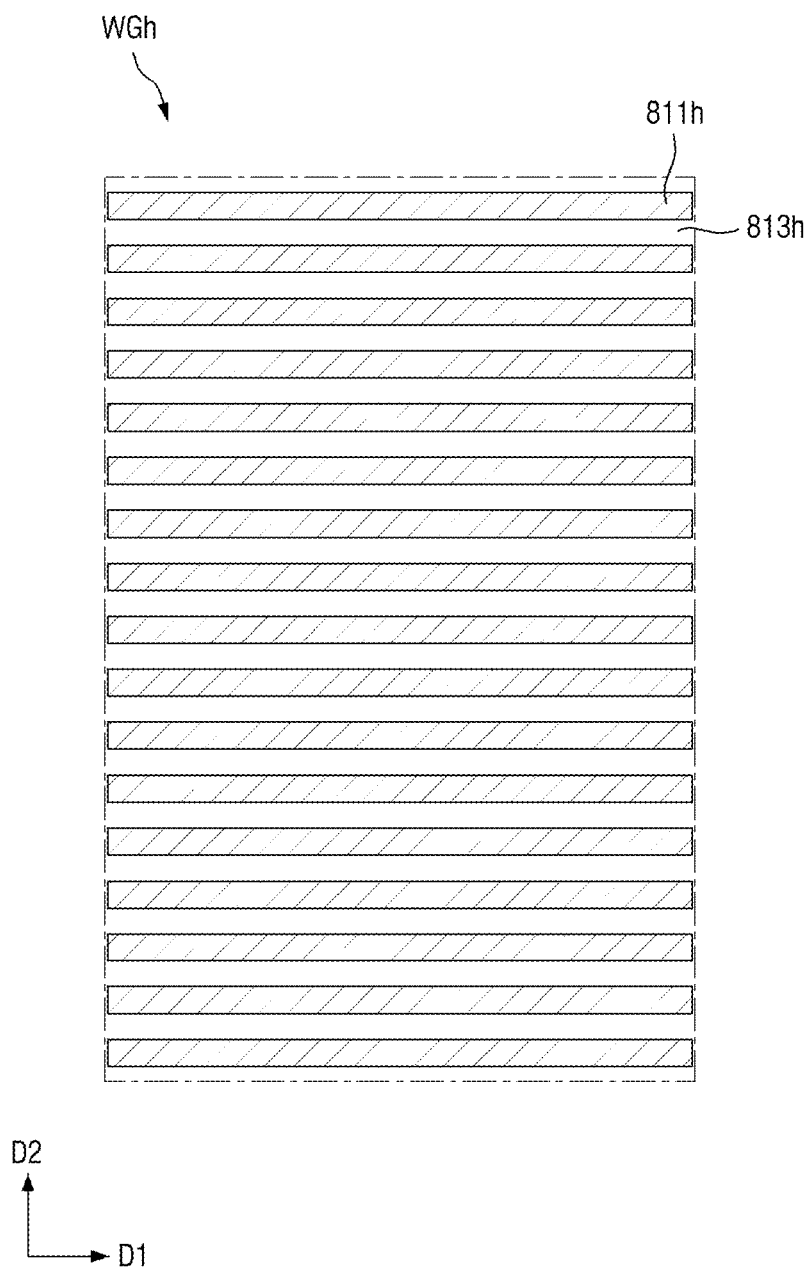
FIG. 24 is a plan view of the upper wire grid layer shown in FIG. 23.

FIG. 23 is a sectional view of a display device according to another embodiment of the present inventive concept, taken along the line X2-X2' of FIG. 20, and FIG. 24 is a plan view of the upper wire grid layer shown in FIG. 23.

Referring to FIGS. 23 and 24, the display device 1a according to this embodiment includes a first substrate 100a, a second substrate 200a disposed to face the first substrate 100a, and a liquid crystal layer 300 disposed between the first substrate 100a and the second substrate 200a. Hereinafter, redundant description will be omitted, and differences will be mainly described.

The substrate 100a is different from the aforementioned substrate (100 of FIG. 21) having described with reference to FIGS. 20 to 22 in that the wire grid layer (WG of FIG. 21) and the wire metal pattern protection layer 111 are not disposed on the first base layer 110. Other components of the substrate 100a are substantially identical to or similar to those of the aforementioned substrate 100.

A polarizer P1 may be disposed beneath the first substrate 100a, and the polarizer P1 may be an extensible polarization film.

Hereinafter, the second substrate 200a will be described.

An upper wire grid layer WGh may be disposed on one side of the second base layer 210.

The upper wire grid layer WGh may include a plurality of upper wire metal patterns 811h extending in one direction (for example, first direction D1). The plurality of upper wire metal patterns 811h may be spaced apart from each other along a direction (for example, second direction D2) crossing the one direction (for example, first direction D1) with a gap 813h therebetween. It is shown in the drawings that the extending direction of the upper wire metal patterns 811h is the first direction D1, which is the same as the extending direction of the gate lines 171. However, this is only one example, and the present inventive concept is not limited thereto.

The upper wire grid layer WGh may be made of an aluminum (Al) alloy containing nickel (Ni) and lanthanum (La) as impurity elements. A detailed description of the upper wire grid layer WGh will be omitted because this upper wire grid layer WGh is substantially the same as the aforementioned wire grid layer (WG of FIG. 2) having been described with reference to FIGS. 1 and 2.

An upper wire metal pattern protection layer 211 may be disposed on the upper wire grid layer WGh h. The upper wire metal pattern protection layer 211 may protect the upper wire grid layer WGh, and may be made of silicon oxide or silicon nitride.

A light-blocking member 220, a color filter 230, an overcoat layer 250, and a common electrode 270 may be sequentially disposed on the upper wire metal pattern protection layer 211.

Figure 25:
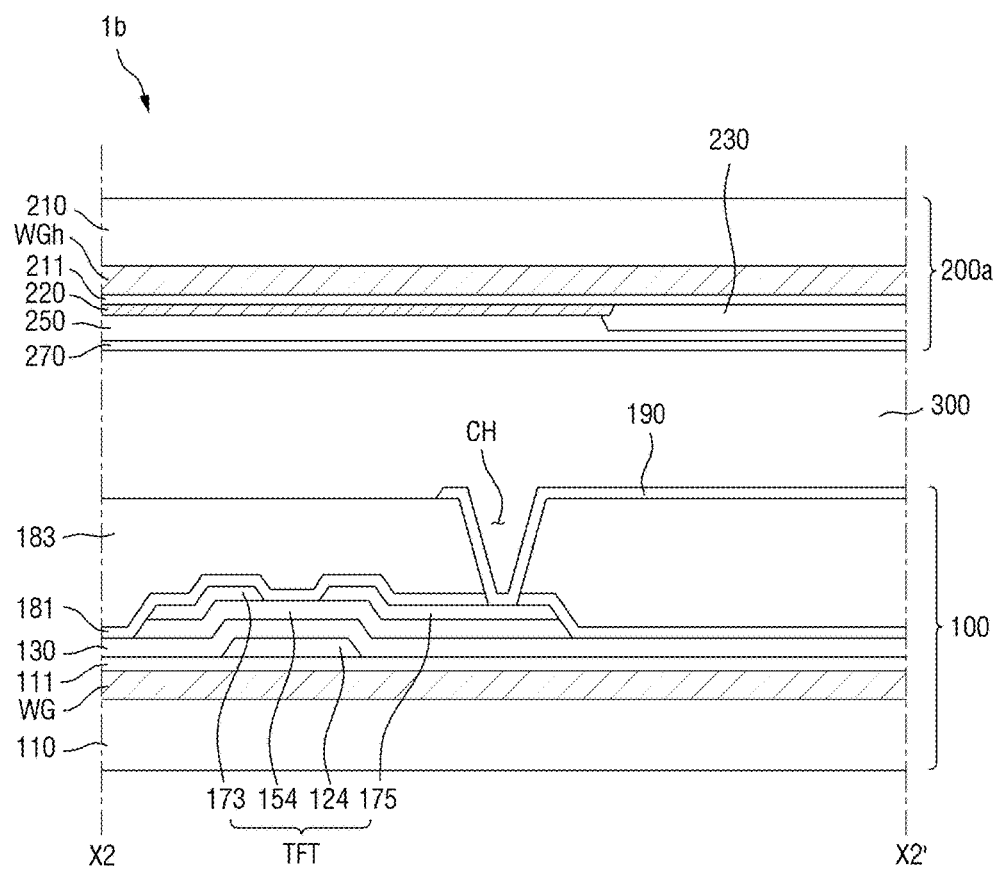
FIG. 25 is a sectional view of a display device according to still another embodiment of the present inventive concept, taken along the line X2-X2' of FIG. 20.
Figure 26:
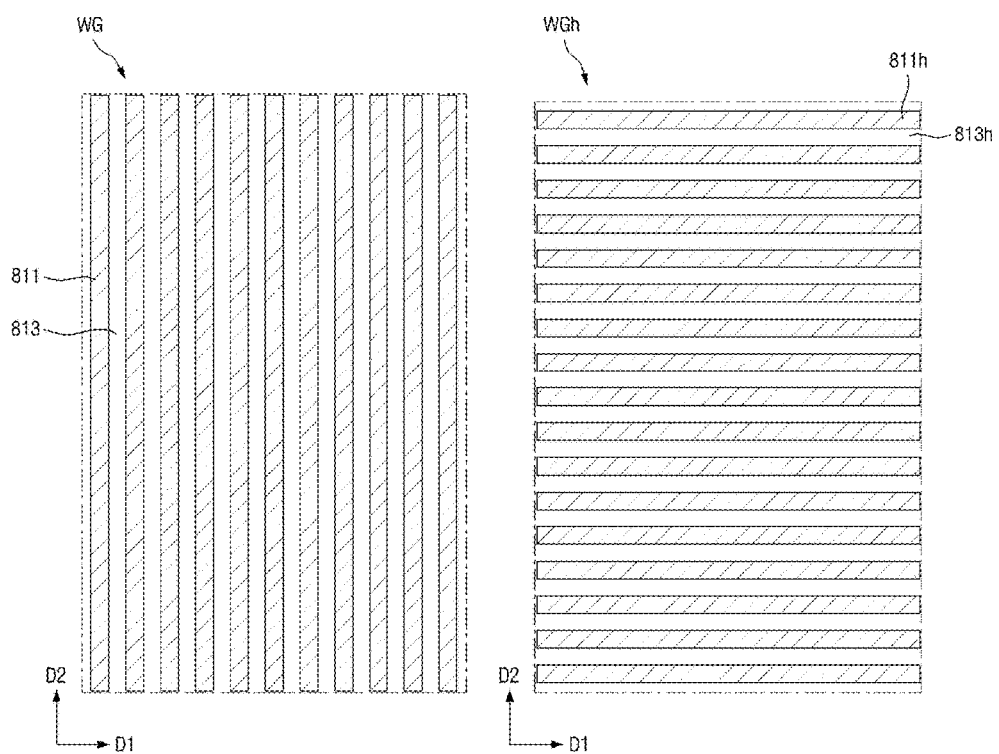
FIG. 26 shows plan views of the wire grid layer and upper wire grid layer shown in FIG. 25.

FIG. 25 is a sectional view of a display device according to still another embodiment of the present inventive concept, taken along the line X2-X2' of FIG. 20, and FIG. 26 shows plan views of the wire grid layer and upper wire grid layer shown in FIG. 25.

Referring to FIGS. 25 and 26, the display device 1b according to this embodiment include a first substrate 100, a second substrate 200a disposed to face the first substrate 100, and a liquid crystal layer 300 disposed between the first substrate 100 and the second substrate 200a.

The extending direction of the wire metal patterns 811 of the wire grid layer WG and the extending direction of the upper wire upper metal patterns 811h of the upper wire grid layer WGh may cross each other. For example, the wire metal patterns 811 may extend along the second direction D2, the upper wire metal patterns 811h may extend in the first direction D1 crossing the second direction D2, and the first direction D1 and the second direction D2 may be perpendicular to each other. That is, the polarization axis of the wire grid layer WG disposed under the liquid crystal layer 300 and the polarization axis of the upper wire grid layer WGh disposed over the liquid crystal layer 300 may be perpendicular to each other. This configuration is the same as a configuration in which the polarization axes of general polarizers disposed under and over the liquid crystal layer 300 are perpendicular to each other. However, the present inventive concept is not limited thereto, and the relationship between the extending direction of the wire metal patterns 811 and the extending direction of the upper wire upper metal patterns 811h may be variously changed, if necessary.

The aforementioned display devices according to the embodiments of the present inventive concept are advantageous in that the reliability of the display devices is improved because each of these display devices includes a wire grid layer having improved reliability and optical properties.

Meanwhile, it is shown that each of the aforementioned display devices (1, 1a, and 1b) according to the embodiments of the present inventive concept includes the wire grid layer (WG of FIGS. 1 and 2) having been described with reference to FIGS. 1 and 2, but the present inventive concept is limited thereto. The wire grid layers (WGa of FIG. 3, WGb of FIG. 4, and WGc of FIG. 5) having been described with reference to FIGS. 3 to 5 may also be applied to the display devices according to the embodiments of the present inventive concept.

Although the preferred embodiments of the present inventive concept have been disclosed for illustrative purposes, those skilled in the art will appreciate that various modifications, additions and substitutions are possible, without departing from the scope and spirit of the invention as disclosed in the accompanying claims.

What is claimed is:
1. A polarizer, comprising:
a base layer; and
a wire grid layer which is disposed on the base layer and which includes a plurality of wire metal patterns extending along a first direction, the plurality of wire metal patterns spaced apart from each other along a second direction crossing the first direction,
wherein the wire grid layer is made of an aluminum (Al) alloy containing nickel (Ni) and lanthanum (La), and
wherein the content of nickel (Ni) in the aluminum (Al) alloy is 0.01 at % to 0.08 at %, and the content of lanthanum (La) in the aluminum (Al) alloy is 0.01 at % to 0.08 at %.

2. The polarizer of claim 1,
wherein the total content of nickel (Ni) and lanthanum (La) in the aluminum (Al) alloy is 0.1 at % or less.

3. The polarizer of claim 1,
wherein the content of nickel (Ni) in the aluminum (Al) alloy is 0.02 at %, and the content of lanthanum (La) in the aluminum (Al) alloy is 0.04 at %.

4. The polarizer of claim 1,
wherein the refractive index of the aluminum (Al) alloy is 0.9 to 1.1, and the extinction coefficient of the aluminum (Al) alloy is 6.4 or more.

5. The polarizer of claim 1,
wherein the wire grid layer further includes an oxide film formed on a surface of each of the plurality of wire metal patterns, and the oxide film is made of an oxide of the aluminum (Al) alloy.

6. The polarizer of claim 1,
wherein the wire grid layer further include a hard mask pattern disposed on each of the plurality of wire metal patterns.

7. The polarizer of claim 6,
wherein the hard mask pattern contain silicon oxide or silicon nitride.

8. The polarizer of claim 6,
wherein the wire grid layer further includes an oxide film formed on a lateral side of each of the plurality of wire metal patterns, and the oxide film is made of an oxide of the aluminum (Al) alloy.

9. A method of manufacturing a polarizer, comprising:
forming a metal layer on a base layer;
forming a hard mask layer on the metal layer using chemical vapor deposition;
forming a resist layer on the hard mask layer;
pressing the resist layer using a mold to form a resist pattern;
etching the hard mask layer using the resist pattern as a mask; and
etching the metal layer using the etched hard mask layer as a mask,
wherein the metal layer is made of an aluminum (Al) alloy containing nickel (Ni) and lanthanum (La), and
wherein the content of nickel (Ni) in the aluminum (Al) alloy is 0.01 at % to 0.08 at %, and the content of lanthanum (La) in the aluminum (Al) alloy is 0.01 at % to 0.08 at %.

10. A display device, comprising:
a first substrate including a base layer, and a first wire grid layer which is disposed on the base layer and which include a plurality of first wire metal patterns extending along a first direction, the plurality of first wire metal patterns spaced apart from each other along a second direction crossing the first direction;
a second substrate facing the first substrate; and
a liquid crystal layer disposed between the first substrate and the second substrate, wherein the first wire grid layer is made of an aluminum (Al) alloy containing nickel (Ni) and lanthanum (La), and wherein the content of nickel (Ni) in the aluminum (Al) alloy is 0.01 at % to 0.08 at %, and the content of lanthanum (La) in the aluminum (Al) alloy is 0.01 at % to 0.08 at %.

11. The display device of claim 10, wherein the total content of nickel (Ni) and lanthanum (La) in the aluminum (Al) alloy is 0.1 at % or less.

12. The display device of claim 11, wherein the content of nickel (Ni) in the aluminum (Al) alloy is 0.02 at %, and the content of lanthanum (La) in the aluminum (Al) alloy is 0.04 at %.

13. The display device of claim 10, wherein the first wire grid layer further includes an oxide film formed on a surface of each of the plurality of first wire metal patterns, and the oxide film is made of an oxide of the aluminum (Al) alloy.

14. The display device of claim 10, wherein the first wire grid layer further include a hard mask pattern disposed on each of the plurality of first wire metal patterns.

15. The display device of claim 10, wherein the first substrate further includes:

a first wire metal pattern protection layer disposed on the first wire grid layer;

a thin film transistor disposed on the first wire metal pattern protection layer;

an insulation layer disposed on the thin film transistor; and a pixel electrode disposed on the insulation layer and electrically connected with the thin film transistor.

16. The display device of claim 10, wherein the second substrate includes:

a second base layer; and a second wire grid layer which is disposed on one side of the second base layer facing the first substrate and which include a plurality of second wire metal patterns extending along one direction, the plurality of second wire metal patterns spaced apart from each other along an other direction crossing the one direction.

17. The display device of claim 16, wherein the one direction is perpendicular to the first direction.

18. The display device of claim 16, wherein the second wire grid layer is made of an aluminum (Al) alloy containing nickel (Ni) and lanthanum (La).

19. The display device of claim 16, wherein the second substrate further include:

a second wire metal pattern protection layer disposed on the second wire grid layer; and a light-blocking member disposed on the second wire metal pattern protection layer.

* * * * *